United States Patent Office 2,701,784
Patented Feb. 8, 1955

2,701,784

REFINING PETROLEUM FRACTIONS

Stephen P. Cauley, Jackson Heights, N. Y., assignor to Socony-Vacuum Oil Company, Incorporated, a corporation of New York No Drawing. Application April 6, 1944, Serial No. 529,833

7 Claims. (Cl. 196—32)

This invention has to do with the regeneration of spent alkaline reagent solutions derived from the treatment of petroleum hydrocarbon fractions.

Petroleum hydrocarbon fractions of the nature of gasoline, kerosene, and the like including natural gasoline, straight run and cracked gasolines and naphthas and the like are customarily treated with aqueous alkaline reagents, as caustic soda, caustic potash, etc., for the purpose of removing from the oil weakly acidic bodies, sulphur containing compounds, and other contaminants. When the purpose is the removal of mercaptans, as is usually the case, there may be present in the aqueous alkaline reagent a solubility promoter, such as for example isobutyric acid, cresol, or other material capable of enhancing the capability of the alkaline reagent for removing the mercaptans from the oil. It is usual to regenerate the spent reagent, and this has commonly been done by steaming, with or without intervening dilution, to separate and distill the mercaptans away from the reagent. More recently it has been proposed to regenerate these spent reagents by oxidation, as by blowing with air, in the presence of certain organic oxidation promoters. This results in the oxidation of mercaptides to alkyl disulphides, insoluble in the reagent, followed by physical separation of such disulphides. Copending applications Serial No. 490,490, now U. S. Patent No. 2,606,099, and Serial No. 490,491, now U. S. Patent No. 2,516,837, disclose the use of certain polyhydroxy benzenes, polyhydroxy benzene derivatives, and preferably materials of polyhydroxybenzene derivative nature comprising the complex group of organic materials known collectively as the tannins or tannic acid as organic oxidation promoters for such purpose. This invention has specifically to do with the regeneration of mercaptan-containing aqueous alkali metal hydroxide in the presence of such oxidation promoters.

This invention has for its object the provision of a method of handling and of regeneration of such solutions capable of giving a properly regenerated solution of high capability for removing mercaptans from oil to be treated while at the same time retaining, under proper protection, a sufficient amount of the organic oxidation promoter to permit cyclic treatment and regeneration of the reagent without addition of substantial amounts of oxidation promoter.

The oxidation promoters are themselves capable of oxidation under the conditions of regeneration. That is, if air is blown through a solution of tannin in aqueous caustic alkali at atmospheric temperature or slightly above, tannin will be oxidized. In the reagent for the cyclic use in question, this may be avoided, as pointed out in aforementioned copending applications, by allowing a certain protective residual percentage of mercaptan sulphur, say about 0.3% by weight, calculated as mercaptan, based upon the caustic solution, to remain unoxidized. Under these conditions, the organic oxidation promoter is not oxidized itself to any substantial degree, and the reagent may pass through many cycles of operation without requiring substantial makeup of promoter.

Such reagents exhibit marked differences in removal capabilities with respect to mercaptans of different molecular weights. Ethyl and methyl mercaptans may be removed with relative ease, having partition coefficients which are quite high, while $C_5$ and $C_6$ mercaptans have relatively low partition coefficients with the same reagent solution. To put this another way, a regenerated reagent for use in removing heavy mercaptans must have its heavy mercaptide content reduced to a quite low figure, while one for removing light mercaptans need not have its light mercaptide content reduced to a comparatively low figure. Also, a regenerated or partially spent reagent containing appreciable quantities of light mercaptides but no appreciable quantity of heavy mercaptides will still be a good reagent for heavy mercaptan removal. On the other hand, a reagent which is spent so far as its capability for removing heavy mercaptans is concerned may still be quite efficient for the removal of light mercaptans.

The extent to which an aqueous alkali metal hydroxide reagent containing heavy mercaptides must be regenerated to be an efficient reagent for the removal of heavy mercaptans from oils frequently finds itself in conflict with the required amount of residual mercaptan which must be allowed to remain to protect the organic oxidation promoter, and efficient regeneration of a spent reagent containing substantially only heavy mercaptides frequently requires sacrifice of an appreciable amount of the oxidation promoter.

A further variable in this system is that under the usual conditions of regeneration, i. e., by blowing with an oxidizing gas at or near atmospheric temperature in the presence of the indicated organic oxidation promoters, the heavy mercaptides are oxidized to the corresponding disulphides with greater ease than are the light mercaptides.

Now it has been found that so long as the required amount of mercaptan sulphur is present in the solution undergoing regeneration, it makes little difference whether that required amount of sulphur is present in the form of light mercaptides or of heavy mercaptides.

In operation according to the present invention these several facts are made use of concurrently, by conducting regeneration of the spent aqueous alkali metal hydroxide reagents containing heavy mercaptides in the presence of organic oxidation promoters and in the presence of a substantial amount of light mercaptides, sufficient so that while there still remains sufficient residual mercaptan sulphur to protect the oxidation promoter there still may be achieved a substantially complete removal of heavy mercaptides by oxidation.

Operating in this fashion, there may be obtained a regenerated reagent containing substantially no heavy mercaptides, or at least little enough to give a reagent effective for the removal of heavy mercaptans, in which substantially all of the residual, "protective" mercaptide is light mercaptide, and which is also a reagent of high effectiveness for the removal of light mercaptans.

Heavy mercaptans are normally found in straight run gasoline, kerosenes, etc., while the light mercaptans are more commonly present in light natural gasoline fractions, cracked naphthas, etc. Consequently, when treating a stock in which the mercaptans are predominantly heavy mercaptans, with insufficient light mercaptans to give a spent reagent suitable for operation according to this invention, several methods and combinations may be used to insure the presence of a desired amount of light mercaptide material in the reagent to be regenerated.

In one method of operation, the regenerated reagent may be divided into two portions, one of which is used for the removal of mercaptans from the stock containing substantially only heavy mercaptans, the other being utilized in treating a stock containing a substantial amount of light mercaptans, and the two portions may be re-combined prior to or during regeneration. In other circumstances, the regenerated reagent may be used to treat the stock containing predominantly heavy mercaptans, and then utilized for treating the stock containing light mercaptans and then regenerated. The exact sequence, combination, or arrangement of such treating steps, designed to secure for regeneration a spent reagent containing both light mercaptides and heavy mercaptides will depend upon the amount, availability, and mercaptan distribution of the several mercaptan-containing stocks and the various arrangements are well within the capability of operators skilled in the art. All such modifications are considered as within the scope of this invention, as limited only by the appended claims. Furthermore the expression "lower boiling" when used in the appended claims to modify the words "mercaptans" and "mercaptides" is equivalent to the words "light" or "lighter" used in the specification to modify the words "mercaptans" or "mercaptides." Similarly the expression "higher boiling" as used in the appended claims to modify the words "mercaptans" and "mercaptides" has the same connotation as the word "heavier" used in the specification to modify the words "mercaptans" and "mercaptides."

I claim:

1. In the regeneration by oxidation of an aqueous alkaline reagent containing mercaptides in the presence of an organic oxidation promoter itself capable of oxidation, the improvement which comprises conducting the oxidation in the presence of both light mercaptides and heavy mercaptides, the ratio of the light mercaptides to heavy mercaptides being so adjusted that the light mercaptides are present in the final stage of the oxidation of the heavy mercaptides in an amount sufficient to provide for substantially complete removal of heavy mercaptides by oxidation to disulphides together with similar oxidation of light mercaptides to an extent sufficient to leave in the regenerated reagent sufficient only of light mercaptides to prevent substantially oxidation of the organic oxidation promoter.

2. In the treatment of hydrocarbon oils containing heavy mercaptides for the removal thereof which comprises contacting oil containing heavy mercaptides with aqueous alkali metal hydroxide reagent containing an effective amount of soluble organic oxidation promoter itself capable of oxidation and an amount of mercaptides sufficient to protect said promoter to extract said mercaptans and to produce a fat reagent containing heavy mercaptides, separating said fat reagent, regenerating said fat reagent by passing oxygen-containing oxidizing gas therethrough to oxidize a portion of said mercaptides to disulfides and to retain sufficient of said mercaptides to protect said promoter, separating said disulfides to produce a lean reagent, and contacting hydrocarbon oil containing heavy mercaptides with said lean reagent, the improvement which comprises contacting hydrocarbon oil containing predominantly heavy mercaptans with aqueous alkali metal hydroxide reagent containing an effective amount of soluble organic oxidation promoter itself capable of oxidation and an amount of mercaptides sufficient to protect said promoter to extract heavy mercaptans and to produce a fouled reagent containing heavy mercaptides, introducing light mercaptans into said fouled reagent in an amount sufficient to ensure substantially complete oxidation of said heavy mercaptides to disulfides whilst oxidizing a portion of said light mercaptides during regeneration and to retain sufficient mercaptides comprising substantially only light mercaptides to protect said soluble organic oxidation promoter after regeneration, regenerating said fouled reagent by passing oxygen-containing oxidizing gas therethrough to oxidize substantially all of said heavy mercaptides and a portion of said light mercaptides to disulfides whilst retaining an amount of mercaptides comprising substantially only light mercaptides sufficient to protect said promoter, and separating said disulfides to obtain a lean reagent containing a protective amount of mercaptan sulfur comprising substantially only light mercaptides.

3. A method for the treatment of hydrocarbon oils containing predominantly heavy mercaptans which comprises establishing a first stream of hydrocarbon oil containing predominantly heavy mercaptans, admixing with said first stream of hydrocarbon oil a second stream of hydrocarbon oil containing predominantly light mercaptans in an amount sufficient that the resultant stream contains an amount of light mercaptans at least 0.3% greater than the amount of heavy mercaptans, contacting said resultant stream with an aqueous alkaline solution containing a phenolic oxidation promoter to extract both light and heavy mercaptans therefrom to obtain a fouled alkaline solution containing heavy mercaptides and an amount of light mercaptides at least 0.3% in excess of the amount of said heavy mercaptides, separating said fouled solution from said resultant stream of hydrocarbon oil, passing free oxygen through said fouled solution in the presence of said phenolic oxidation promoter until all of said heavy mercaptides have been oxidized to polysulfides and all but about 0.3% of said light mercaptides have been oxidized to polysulfides, separating said polysulfides from said alkaline solution whereby a regenerated alkaline solution is produced containing about 0.3% of light mercaptides only, and contacting said regenerated solution with a mixture of hydrocarbon fraction containing predominantly heavy mercaptans and a hydrocarbon fraction containing predominantly light mercaptans, the ratio of light mercaptans to heavy mercaptans in said mixture being such as to maintain at least 0.3% light mercaptides only in said regenerated alkaline solution.

4. A method of treating hydrocarbon oils containing predominantly heavy mercaptans which comprises mixing a hydrocarbon oil containing predominantly heavy mercaptans with a hydrocarbon oil containing light mercaptans to provide a mixture containing mercaptan sulfur present as light mercaptans in excess of mercaptan sulfur present as heavy mercaptans. contacting said mixture with an aqueous alkaline solution capable of extracting both heavy and light mercaptans from said mixture and containing a phenolic oxidation promoter to yield a fouled aqueous alkaline solution containing mercaptan sulfur present as light mercaptides in a ratio to mercaptan sulfur present as heavy mercaptides of 1+0.3% to *1 and said phenolic oxidation promoter, passing oxygen through said fouled solution until said mercaptides have been oxidized to polysulfides but to leave unoxidized only light mercaptans equivalent to about 0.3% mercaptan sulfur to substantially prevent oxidation of said phenolic oxidation promoter, separating said polysulfides from said aqueous alkaline solution to produce a regenerated alkaline solution containing sufficient only light mercaptides to substantially prevent oxidation of said phenolic oxidation promoter, and contacting a mixture of hydrocarbon oils containing light mercaptans and heavy mercaptans in a ratio to maintain only light mercaptides in said regenerated solution sufficient to substantially prevent oxidation of said phenolic oxidation promoter.

5. The method of treating hydrocarbon oils described and set forth in claim 4 wherein the phenolic oxidation promoter is dihydroxybenzene.

6. The method of treating hydrocarbon oils described and set forth in claim 4 wherein the phenolic oxidation promoter is a trihydroxybenzene.

7. The method of treating hydrocarbon oils described and set forth in claim 4 wherein the phenolic oxidation promoter is a tannin.

References Cited in the file of this patent

UNITED STATES PATENTS

| | | |
|---|---|---|
| 1,943,744 | Rosenstein | Jan. 16, 1934 |
| 1,998,849 | Schulze | Apr. 23, 1935 |
| 1,998,863 | Chaney et al. | Apr. 23, 1935 |
| 2,258,279 | Caselli et al. | Oct. 7, 1941 |
| 2,315,530 | Loyd | Apr 6, 1943 |
| 2,316,092 | Loyd | Apr. 6, 1943 |
| 2,324,927 | Heilman | July 20, 1943 |
| 2,369,771 | Bond | Feb. 20, 1945 |